United States Patent [19]

Parizet

[11] 4,301,988

[45] Nov. 24, 1981

[54] SLIDE STRUCTURE FOR A VEHICLE SEAT AND CORRESPONDING SEAT MOUNT

[75] Inventor: Roger Parizet, Bonnee, France

[73] Assignee: Campagnie Industrielle de Mecanismes en Abrege CII.M., Levallois Perret, France

[21] Appl. No.: 80,925

[22] Filed: Oct. 1, 1979

[30] Foreign Application Priority Data

Oct. 6, 1978 [FR] France .................... 78 28642

[51] Int. Cl.³ .............................................. B60N 1/08
[52] U.S. Cl. .................................... 248/430; 248/393
[58] Field of Search ............... 248/430, 429, 393, 397; 108/143; 16/112, 110 R

[56] References Cited

U.S. PATENT DOCUMENTS 2,636,545  4/1953  Johnson ............................ 248/430
3,279,737  10/1966  Krause ............................. 248/430

FOREIGN PATENT DOCUMENTS 2426900  12/1974  Fed. Rep. of Germany ...... 248/429
1441272  6/1976  United Kingdom ............... 248/430

Primary Examiner—James T. McCall
Attorney, Agent, or Firm—Holman & Stern

[57] ABSTRACT

A vehicle seat adjustable slide structure comprises two slides, interengaging a locking lever pivotally supported by a tab cut out of the outer slide which is folded over and extends through an opening in the lever with a clearance which allows the movement of the lever between a seat locking position and a seat releasing position for movement of the seat in translation. The slide structure is applicable to the mounts of adjustable automobile se 10 Claims, 7 Drawing Figures

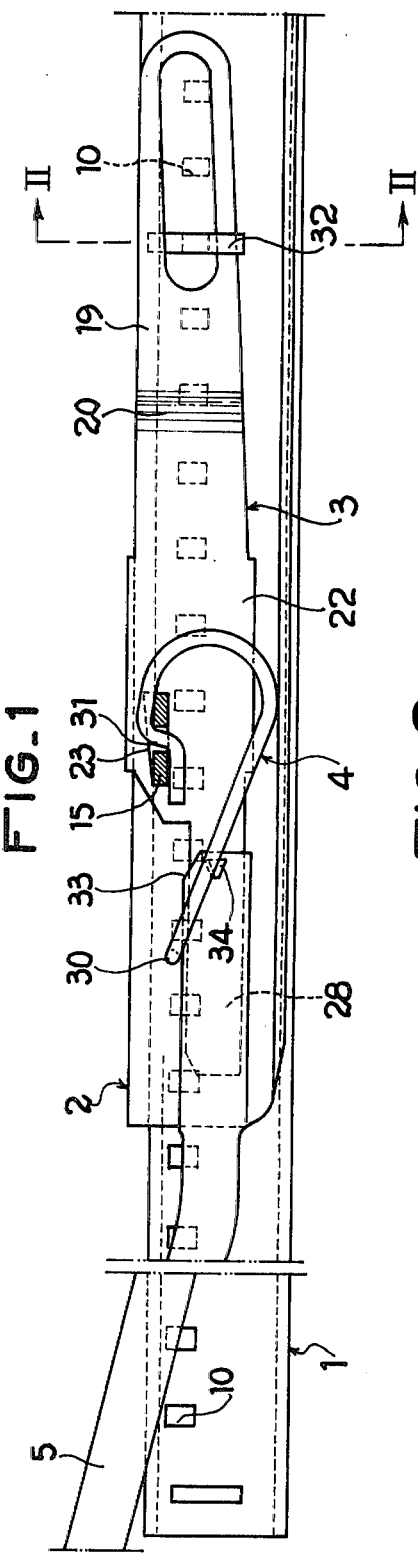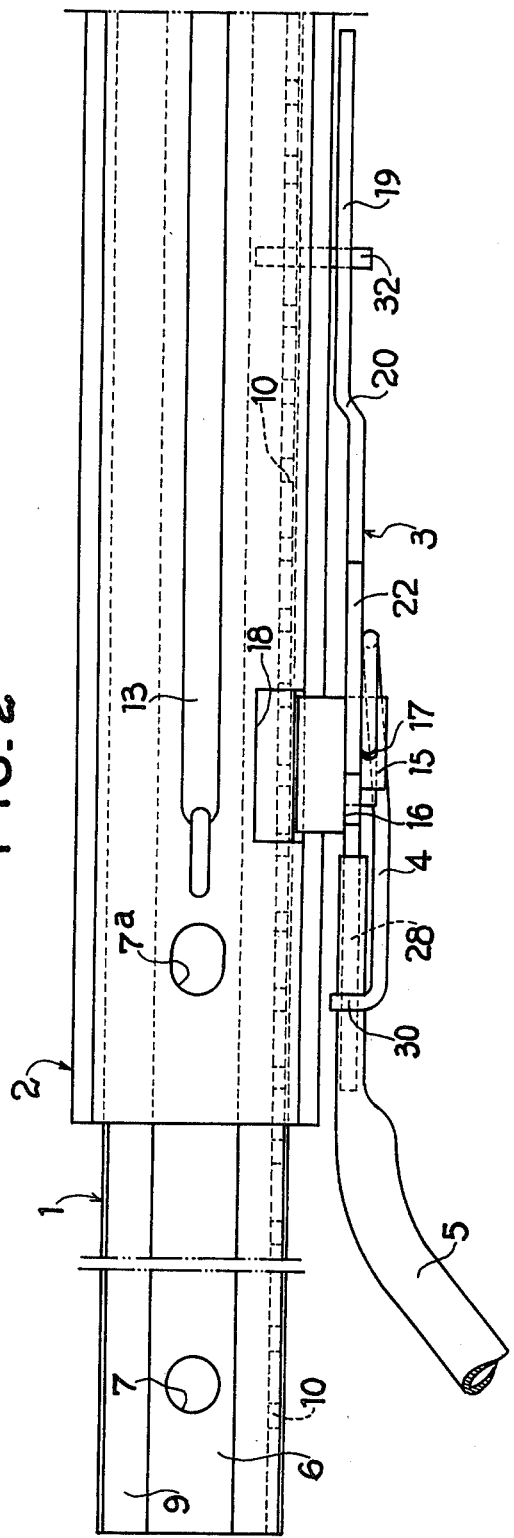

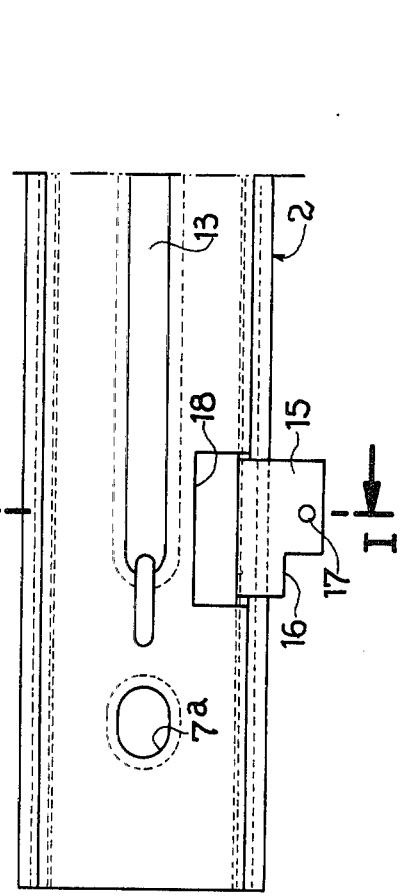
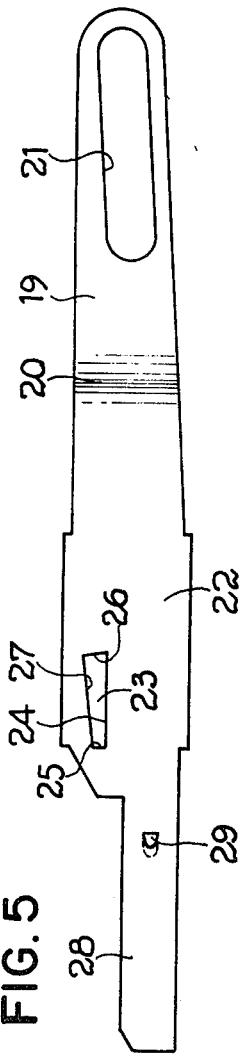
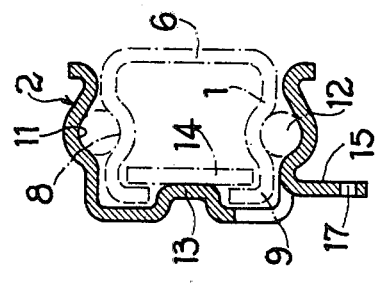

SLIDE STRUCTURE FOR A VEHICLE SEAT AND CORRESPONDING SEAT MOUNT

BRIEF SUMMARY OF THE INVENTION

The present invention relates to slide structures for vehicle seats which have a longitudinally adjustable position. It concerns more particularly a slide structure having two slides one of which carries a locking lever which pivots in a plane between a position for locking the movable slide against movement in translation and to which position it is elastically biased, and a position for unlocking said slide.

In existing slide structures, the pivotal mounting of the lever on its slide is usually achieved by means of an added pivot pin, for example a rivet, which has one end which is fixed to the slide and another end which extends through a circular aperture of the lever without clearance.

An object of the invention is to provide a cheaper arrangement which is easier to assemble. Thus the invention provides a slide structure of the aforementioned type wherein there is provided in the slide carrying the locking lever a tab which is folded in a direction to be perpendicular to said pivot plane and which extends through an opening in the lever with a clearance which allows the movement of the lever between its two positions.

The number of component parts is reduced to a minimum when the lever is immobilized in a direction perpendicular to the plane of its movement, on the slide side, by a shoulder of the tab and, on the opposite side, by the passage of one end of the lever-returning spring through an aperture in the tab.

Preferably, the opening in the lever has the shape of a right-angled trapezium having a large curvilinear base, a height which is equal to the length of the tab and a small base which is equal to the thickness of this tab. In this way, a perfect guiding of the lever in rotation is achieved very simply.

Another object of the invention is to provide a vehicle seat mount comprising two slide structures such as defined hereinbefore, the two levers being interconnected by common shifting means.

BRIEF DESCRIPTION OF THE SEVERAL VIEWS OF THE DRAWING

Further features and advantages of the invention will be apparent from the ensuing description which is given by way of a nonlimitative example with reference to the accompanying drawings in which:

FIG. 1 is a partial side elevational view, with a part cut away, of a slide structure according to the invention;

FIG. 2 is a top plan view of the slide structure of FIG. 1;

FIG. 3 is a partial plane view of the outer slide of the slide structure of FIGS. 1 and 2;

FIG. 4 is a sectional view taken on line I—I of FIG. 3, and

FIGS. 5 and 6 are respectively a side elevational view and a plan view of the lever for locking the slide structure of FIGS. 1 and 2.

FIG. 7 is a cross-sectional view taken on line II—II of FIG. 1.

DETAILED DESCRIPTION

The slide structure, whose front part is shown in FIGS. 1 and 2, comprises two metal slides 1, 2, and a locking lever 3 provided with a wire-like return spring 4 and shifting means 5. It is adapted to constitute the left half of a vehicle front seat mount.

The inner slide 1 is adapted to be fixed to the floor of a vehicle. It has a generally U-shaped cross-section and a flat bottom 6 which has a fixing aperture 7 at each end. As shown in dot-dash lines in FIG. 4, the branches of the U have inwardly offset recesses roughly at mid-height so as to form two raceways 8 and are bent inwardly at a right angle at their ends so as to form horizontal flanges 9. The outer branch of the U has a series of openings 10 which are equally spaced apart in a part of the length of the slide structure.

The outer slide 2 is adapted to be fixed along the left lower edge of a vehicle front seat. It has an inverted U-shaped cross-section and is fitted on the inner slide 1. The branches of the U are outwardly bent at roughly mid-height so as to form two raceways 11 which are in facing relation to the raceways 8. Balls 12, shown in dot-dash lines in FIG. 4, are trapped in the two passageways formed by the raceways 8 and 11 and axially retained therein by bosses (not shown) which are press-formed in the two slides at suitable places. The bottom of the U is flat only adjacent the ends of the slide structure where fixing apertures 7a are provided. In its body part, this bottom has a median groove 13. Welded to the lower face of the latter, is a horizontal plate 14 whose edges are engaged under the flanges 9 of the inner slide.

In the vicinity of the front end of the slide 2, in a region of the front end of the groove 13, a generally rectangular tab 15 has been cut out on three sides from the left upper corner of the U and has been folded outwardly to a horizontal position. More precisely (FIG. 3), the tab 15 has in plan the shape of a rectangle whose front free corner has a right-angled notch so as to form a longitudinal shoulder 16. A circular aperture 17 is provided in the rear part of the tab 15 near to its free longitudinal edge. The folding over of the tab 15 leaves in the corner of the slide 2 an opening 18 whose dimensions are slightly larger and whose part which is located in the bottom of the U has a rectangular shape (FIG. 3).

The locking lever 3 is generally located in a vertical plane and has a constant thickness; its general shape is planar but it has in its front part 19 a cranked portion 20 (FIGS. 5 and 6). This part 19 is provided with a longitudinal slot 21.

The median part 22 of the lever 3, which has a slightly greater height, is provided with an opening 23 which has the general shape of a right-angled trapezium. More precisely, the contour of this opening is formed by a lower horizontal side 24, a small base 25 on the front side, a large curvilinear base 26 on the rear side and an oblique upper side 27. The side 24 has the same length as the part of the tab 15 provided with the aperture 17, the base 25 is equal to the thickness of this tab, and the base 26 is formed by an arc of a circle which is centered on the upper end of the base 25 downwardly extended by a vertical straight segment. The angle between the straight sides 24 and 27 is small, for example of the order of 5°.

The lever 3 is forwardly extended by a rectangular tail portion 28 provided with a rearwardly oriented press-formed projection 29.

The spring 4 has roughly the shape of a planar J having one end 30 which is curved transversely of its plane and an opposite end which has a cranked portion 31.

To mount the lever 3 on the slide 2, it is sufficient to slip the rear part of the tab 15 into the opening 23 until the lever 3 abuts against the shoulder 16. The aperture 17 then appears alongside the lever and the end of the spring 4 provided with the cranked portion 31 is passed therethrough from above so as to position the lever transversely of its plane.

By stressing the spring 4, the end 30 of the latter is made to bear against the upper edge of the tail portion 28 of the lever 3; the latter thus constantly tends to raise its front part 19 and bring the side 24 of the opening 23 against the lower face of the tab 15, as shown in FIG. 1.

This normal position of the lever 3 corresponds to the locking of the slide 2 in translation relative to the slide 1. For this purpose, the slide structure is provided with a conventional transverse lock member 32 which is mounted on a small cylinder 40 retained for pivotal movement formed by raceways 8-11 as shown in FIG. 7. The lock member 32 extends through a slot of the slide 2 and its outer part is maintained in the slot 21 of the lever 3. The other end of this lock member forms an arcuate nose portion 42 which is capable of entering or withdrawing from an opening 10 of the slide 1 located in confronting relation thereto according to the position of lever 3.

The vehicle seat (not shown) is mounted on two symmetrical slide structures of the type described hereinabove. The two levers 3 are interconnected by shifting means 5 which shifts them in synchronism. These means 5 comprise a U-shaped tubular stirrup whose ends are flattened and fitted on the two tail portions 28. Each end has an upper ramp 33 and a lateral opening 34. When it is fitted on the associated tail portion 28, the ramp 33 raises the end 30 of the spring 4 and the projection 29 of the lever clips into the corresponding opening 34. Consequently, the stirrup 5 is readily placed in position.

The transverse part of the stirrup 5 projects from the front part of the seat. In order to release the seat for movement in translation, this transverse part is raised and this raises the two tail portions 28 and causes the levers 3 to pivot in the clockwise direction as viewed in FIG. 1, in opposition to the action of their springs 4, about pivots which are defined by the front upper corners of the openings 23. The front parts of the two levers thus descend until the oblique sides 27 of the openings 23 abut against the upper face of the respective tabs 15. This causes the locking nose portions of the lock members 32 to rise and disengage from the openings 10. It is then possible to adjust the longitudinal position of the seat; when the stirrup 5 is released, the springs 4 return the levers 3 to their original angular position and the nose portions of the lock members 32 are engaged in the confronting openings 10.

The locking device described hereinabove is very cheap to produce and very easy to assemble while it perfectly guides the pivotal levers 3. It will be understood that it is applicable to any type of slide structure; for example, the stirrup 15 may be replaced by a single lever, in particular by an extension of the lever 3; the latter could actuate two lock members 32 which are longitudinally spaced apart in the slot 21 or itself terminate in a bent locking nose portion; the lever 3 could pivot in a horizontal plane, in which case the tab 15 would be vertical.

Having now described my invention what I claim as new and desire to secure by Letters Patent is:

1. A slide structure for a vehicle seat, comprising two slides, one of which slides is cooperable with the other slide to be movable in translation relative to said other slide, a locking lever mounted on one of the slides to be pivotable in a plane between a position for locking the movable slide against translation relative to said other slide and a position for unlocking said movable slide relative to said other slide, elastically yieldable means for biasing the lever toward said locking position, the slide carrying the locking lever having a cut-out tab which is folded over in a direction to be substantially perpendicular to said pivot plane, the lever having an opening through which said tab extends with a clearance which permits the movement of the lever between said two positions.

2. A slide structure as claimed in claim 1, wherein abutment of the tab against edges of the opening defines the two positions of the lever.

3. A slide structure as claimed in claim 1 or 2, wherein said tab has a shoulder which immobilizes the lever transversely of said pivot plane on a side of the lever adjacent the slide on which the lever is mounted.

4. A slide structure as claimed in claim 1, 2 or 3, comprising an aperture in the tab and an element which forms a pin which extends through the tab aperture and immobilizes the lever transversely of said pivot plane on a side of the lever remote from the slide on which slide the lever is mounted.

5. A slide structure as claimed in claim 4, wherein the elastically yieldable means comprise a spring and the element forming a pin comprises an end portion of said spring.

6. A slide structure as claimed in claim 1 or 2, wherein the opening has the shape of a right-angled trapezium having a curvilinear large base, a height which is equal to the length of the tab and a small base which is equal to the thickness of said tab.

7. A slide structure as claimed in claim 1 or 2, wherein the lever is a lever having two arms and shifting means are clipped on one of said two arms.

8. A slide structure as claimed in claim 7, comprising an opening in the shifting means and a projection on the lever which clips into the opening for retaining the shifting means on the lever.

9. A mount for a vehicle seat, which mount comprises two slide structures and common shifting means for simultaneously actuating the slide structures, each slide structure comprising two slides one of which slides is cooperable with the other slide to be movable in translation relative to said other slide, a locking lever mounted on one of the slides to be pivotable in a plane between a position for locking the movable slide against translation relative to said other slide and a position for unlocking said movable slide relative to said other slide, elastically yieldable means for biasing the lever toward said locking position, the slide carrying the locking lever having a cut-out tab which is folded over in a direction to be substantially perpendicular to said pivot plane, said lever having an opening through which said tab extends with a clearance which permits the movement of the lever between said two positions, said shifting means interconnecting the two levers.

10. A mount as claimed in claim 9, wherein the shifting means is a transverse U-shaped means which projects under a front part of the seat.

* * * * *

UNITED STATES PATENT AND TRADEMARK OFFICE
CERTIFICATE OF CORRECTION

PATENT NO. : 4,301,988
DATED : November 24, 1981
INVENTOR(S) : ROGER PARIZET

It is certified that error appears in the above-identified patent and that said Letters Patent are hereby corrected as shown below:

On the title page,
[73] Assignee: "Campagnie Industrielle de Mecanismes en Abrege CII.M."

SHOULD BE:

--Campagnie Industrielle de Mecanismes en Abrege C.I.M.--

Signed and Sealed this

Fourth Day of May 1982

[SEAL]

Attest:

GERALD J. MOSSINGHOFF

Attesting Officer     Commissioner of Patents and Trademarks